United States Patent [19]

Jiang et al.

[11] Patent Number: 5,940,814
[45] Date of Patent: Aug. 17, 1999

[54] DEFUZZIFICATION STRATEGY AND PARAMETER LEARNING PROCESS

[75] Inventors: Tao Jiang, Wood-Ridge; Yao Li, Monmouth Junction, both of N.J.

[73] Assignee: NEC Research Institute, Inc., Princeton, N.J.

[21] Appl. No.: 08/848,947

[22] Filed: May 1, 1997

[51] Int. Cl.[6] .................................................. G06G 7/00
[52] U.S. Cl. .................. 706/1; 706/8; 706/9; 706/45; 706/52; 706/900
[58] Field of Search ............................ 706/1, 9, 45, 52, 706/3, 4, 8, 900

[56] References Cited

PUBLICATIONS

Tao Jiang et al., "Generalized Defuzzification Strategies and Their Parameter Learning Procedures", IEEE Transactions on Fuzzy Systems, pp. 64–71 vol. 4, No. 1, Feb. 1996.

Halgumage et al., "Validation and Application of an Adaptive Transparent Defuzzification Strategy for Fuzzy Control", pp. 1642–1645, IEEE Conference on Fuzzy Systems, IEEE World Congress on Computational Intelligence, vol. 3, 1994.

Lee, "Fuzzy Logic in Control Systems: Fuzzy Logic Controller—Part 1", IEEE Transactions on Systems, Man And Cybernetics, pp. 404–418 vol. 20, No. 2, Mar./Apr. 1990.

Yager, R.R. et al., "Slide: A Simple Adaptive Defuzzification Method, " IEEE Transactions on Fuzzy Systems, vol. 1, No. 1, pp. 69–78, Feb. 1993.

Primary Examiner—Tariq R. Hafiz
Assistant Examiner—Jason W. Rhodes

[57] ABSTRACT

A multi-mode oriented polynomial transformation based defuzzification strategy uses a Kalman filter in a parameter leaning procedure defuzzification application where two or more distinct possibility peaks exist in its membership function distribution.

6 Claims, 2 Drawing Sheets

DEFUZZIFICATION STRATEGY AND PARAMETER LEARNING PROCESS

FIELD OF THE INVENTION

The present invention relates to the field of artificial intelligence and more particularly to multi-mode defuzzification strategies (DS).

BACKGROUND OF THE INVENTION

Defuzzification is a procedure of considerable importance to control systems that use fuzzy logic because a decisive crisp output control action is required in many practical applications. Defuzzification is a strategy for reaching a final and crisp control decision for a fuzzy logic control system. Various strategies have been advanced including the center of area (COA) and mean of maximum (MOM) approaches.

In an earlier paper, published in EEE Transactions on Fuzzy Systems, Vol. 4, No. Feb. 1, 1996, we have proposed two compromise strategies that combine these two methods, a Gaussian distribution transformation-based defuzzification (GTD) and a polynomial transformation-based defuzzification (PTD). Both strategies can perform better than existing strategies and include the COA and MOM strategies as special cases. Both are based on parameter learning processes using a Kalman filter 50 as to provide iterative improvement algorithms on sample database containing fuzzy sets and the associated defuzzied values. The PTD strategy particularly offers a generalized defuzzification tool for a wide class of possible problems. In particular, this defuzzification strategy does not use a Gaussian function as a specific transformation model as is characteristic of GTD for the weighting function used in the decision making process. Instead, it models the transformation as a polynomial expansion. However, the parameter learning processes are the keys to success in applying either of these strategies. Although various learning models are available, we chose the extended Kalman filter for this role.

As is mentioned in our paper, the strategies discussed were single-mode oriented, where only a single peak in the membership function may exist, but in multi-mode situations where two or more distinct peaks in the membership distribution may occur, the above strategies may lead to inappropriate conclusions.

An object of the present invention is to modify our original PTD strategy to better handle multi-mode situations.

SUMMARY OF THE INVENTION

The present invention relates to multi-mode oriented generalized defuzzification applications and uses a multi-mode oriented Polynomial Transformation based Defuzzification (M-PTD) strategy that uses a Kalman filter in the parameter learning procedure. M-PTD is a constraint free DS that unfolds the internal inverse relation inside a fuzzy set. Based on a learning procedure using the extended Kalman filter, M-PTD performs information selection, inheritance and abandonment, and therefore is suitable for dynamic fuzzy systems. The algorithm that executes the M-PTD is designed to simulate a natural metabolizing process.

As will be discussed below, there exists no single universal DS because each fuzzy system has its own features and structure. An intelligent fuzzy controller needs to be knowledge based and constraint free so that it can discover general and constraint free structure models with undetermined parameters or even sub-structures and the final engine whose internal structure relates the inputs and the outputs is then obtained through learning schemes based on sample data.

It should be noted that the modification-through-learning procedure that is based on a Kalman filter, which characterizes the invention, cannot be exploited in a perfectly symmetric case. It is fortunate that a perfectly symmetric case rarely exists in the real world and usually implies a situation where the information available for use is insufficient for a decision.

A typical multi-mode control scenario can be intuitively imagined as a braking decision of a driver upon approaching a yellow traffic light. When a driver moves the car towards a traffic intersection with a yellow traffic light, a decision of either stopping or accelerating has to be made. As illustrated in FIG. 1, such a yellow light situation involves two different significant solutions (local extremes) that the driver may choose for his action: either suitably brake to stop; or, suitably accelerate to pass the intersection, both before the light turns to red. Here, the word "suitably" addresses the degree of action. For braking, suitability simply implies not too suddenly so as to make passengers feel uncomfortable, or not too sluggishly so as to cause the vehicle to stop beyond the stop line. For accelerating, suitably refers to not too fast so as to cause an uncomfortable ride, or not too slow so as to still be in the intersection when the traffic light changes.

The action that the driver chooses is most likely determined by, among other things, driving habit and personality; conservative or aggressive.

The above example illustrates a typical multi-mode defuzzification situation with a continuous membership function distribution. A decision made using weighted type aggregations, as suggested in most single-mode oriented DS, is not suitable for such an application.

BRIEF DESCRIPTION OF THE DRAWINGS

The invention will be better understood from the following more detailed description taken in conjunction with the accompanying drawing in which.

DETAIL DESCRIPTION

Figure 1:
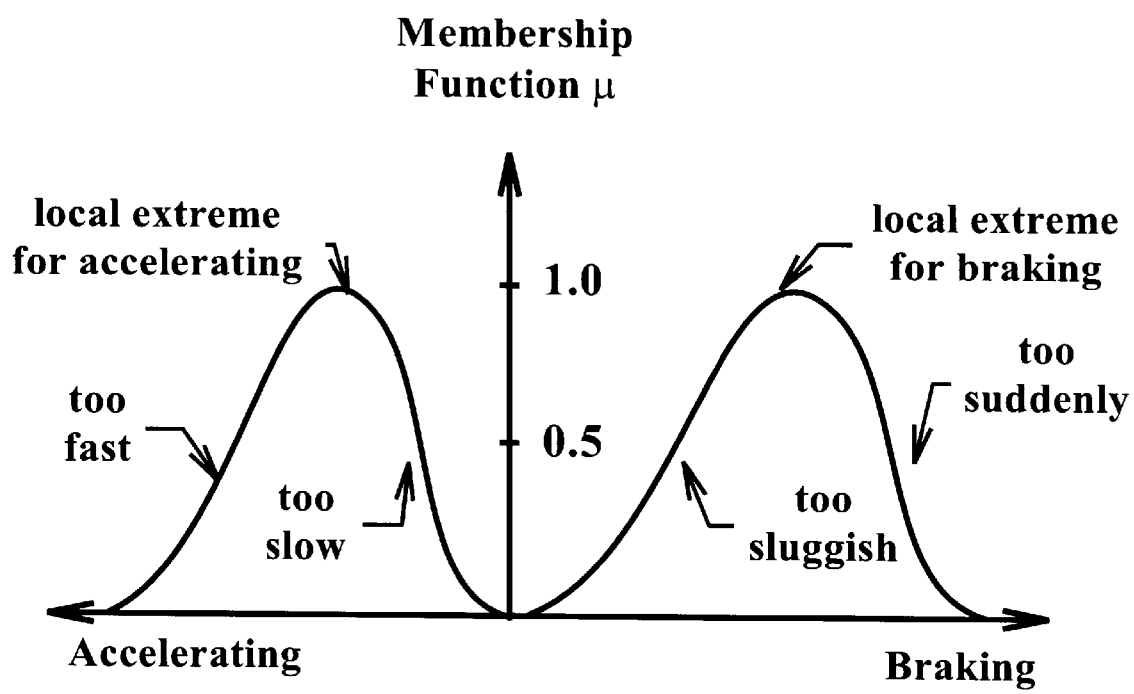
FIG. 1 is a plot of the membership function versus g of the braking decision when approaching a yellow traffic light.

A DS is essentially a mapping process based on a fuzzy set, where the defuzzification information is assumed to be contained in the entire fuzzy set. The reason that a weight based aggregation fails in a multi-mode situation is the ignorance of the opposing effect on the DS inside the fuzzy set.

The existence of multi-local extremes implies that the fuzzy set is a mixture of several clusters. Each cluster groups around a distinct concentration corresponding to a local extreme. Most data points that belong to one cluster may partially belong to another, implying that the boundaries are fuzzy. However, the entire fuzzy set contributes to a final DS value. An important distinction from a single-mode situation is that there exists internal inconsistency or opposite relation in a multi-mode situation. The existence of an inverse relation does not imply that only parts of the fuzzy set the inverse relation in the entire fuzzy set.

To modify DS to include the consideration of such an inverse relation, the single-mode oriented PTD related equitables of our earlier aforementioned paper are rewritten here. As a general expression, defuzzification d is given as:

$$d = \frac{\sum_{i}^{n} \mu_i T_i x_i}{\sum_{i}^{n} \mu_i T_i}, \quad (1)$$

where the transformation $T_i$ is:

$$T_i = [f(\mu_i)]^2 \quad (2)$$

and f(x) satisfies the following conditions: i) f(x) is defined in [0,1]; ii) f(x), ..., $f^{(N-1)}(x)$ exist in [0,1]; iii) $f^{(N)}$ (0.5) exists. Correspondingly, the discrete universe of discourse $X=\{x_1, x_2, ..., x_n\}$ and the membership function $\mu_i$ are defined on a fuzzy set F:

$$F = \{(x_i, \mu_i(x_i) = \mu_i)|_{xi} \in X\} \quad (3)$$

$T_i$ is called the transformation of the defuzzification which is an adaptation on a factor of the system to be described. The existing defuzzification strategies are more or less bound to certain subjective limitations. The only accurate way for decision making on a real system is to employ an adaptive system and to base it on an iterative process. It is easy to see that the positive sign restriction $T_i$ in Eq. (2), introduced by the weighted type aggregation, must be eliminated in order to promote our attempt to utilize the internal inverse relation.

In M-PTD, we redefine $T_i$, the transformation of DS, as:

$$T_i = \sum_{j=0}^{N} \beta_j (\mu_i - 0.5)^j, \quad (4)$$

where $\{\beta_i\}$ are the expansion constants to be determined through parameter learning. The selection of the value 0.5 is addressed in our earlier aforementioned paper. Therefore, Eq. (1) can be rewritten as:

$$d = \frac{\sum_{i} \mu_i \left[\sum_{j=0}^{N} \beta_j \cdot (\mu_i - 0.5)^j\right] x_i}{\sum_{i} \mu_i \left[\sum_{j=0}^{N} \beta_j \cdot (\mu_i - 0.5)^j\right]} \equiv g(\beta_0, \beta_1, ..., \beta_N). \quad (5)$$

In multi-mode situations, a different cluster favors a different local extreme. None of them exclusively decides the ultimate output for the entire fuzzy set. Any attempt to find a DS value with one or more clusters abandoned will end up with an inappropriate solution to the entire fuzzy set. Therefore, the only non-prejudicial way to yield a DS value should be based on learning from an incoming data set, or in other words, learning from given examples.

The DS that we are pursuing is intended for use in general and dynamic systems and thus, should be designed as a self-adapting strategy to include information selection, inheritance and abandonment. The incoming sample data set offers new information about the dynamic system, which actually supplies adaptation motivation. The new information reflects dynamically the current status of the system while the influence from old samples gradually devaluates. Continuous renewal based on incoming new information from the learning sample data set, as well as suppression of the influence of the obsolete information model, is a crucial feature of the DS of the invention. Learning plays the dominant role in the M-PTD.

M-PTD is a nonlinear model. The parameter learning hence evolves as the extended Kalman filter iteratively processes the incoming fuzzy sets. The parameters $\{\beta_i\}$ in Eq. (5) are expressed in the form of a state vector $\beta_k$:

$$\beta_k = \begin{bmatrix} \beta_{0,k} \\ \beta_{1,k} \\ \vdots \\ \beta_{N,k} \end{bmatrix}, \quad (6)$$

where index k corresponds to the order of incoming fuzzy sets. In this case, the dynamic system is characterized by $$\begin{cases} \beta_{k+1} = \beta_k + \xi_k \\ d_k = g_k(\beta_k) + \eta_k, \end{cases} \quad (7)$$

where $d_k$ and $\eta_k$ are scalar defuzzification data and observation noise with variance $R_k$; $\xi_k$ is (N+1) system noise vector with an (N+1)×(N+1) covariance matrix $Q_k$. All noise here is assumed to be the zero-mean Guassian white noise. $G(\beta_k)$ is defined by Eq. (5).

The extended Kalman filter associated with the system in Eq. (7) can be obtained $$\begin{cases} P_{0/0} = \text{Var}(\beta_0), \hat{\beta}_{0/0} = E(\beta_0) \\ \text{for } k = 1, 2, ..., \\ P_{k/k-1} = P_{k-1/k-1} + Q_{k-1} \\ \hat{\beta}_{k/k-1} = \hat{\beta}_{k-1/k-1} \\ G_k = P_{k/k-1} \left[\frac{\partial g_k}{\partial \beta_k}(\hat{\beta}_{k/k-1})\right]^T \\ \quad \left\{\left[\frac{\partial g_k}{\partial \beta_k}(\hat{\beta}_{k/k-1})\right] P_{k/k-1} \left[\frac{\partial g_k}{\partial \beta_k}(\hat{\beta}_{k/k-1})\right]^T + R_k\right\}^{-1} \\ P_{k/k} = \left[I - G_k \frac{\partial g_k}{\partial \beta_k}(\hat{\beta}_{k/k-1})\right] P_{k/k-1} \\ \hat{\beta}_{k/k} = \hat{\beta}_{k/k-1} + G_k[d_k - g_k(\hat{\beta}_{k/k-1})], \end{cases} \quad (8)$$

where P corresponds to an (N+1)×(N+1) matrix, G is the (N+1) system's gain vector of the extended Kalman filter, and $$\left[\frac{\partial g_k}{\partial \beta_k}(\hat{\beta})\right]^T$$

corresponding to $F_k$ is the (N+1) vector-valued function defined by $$\left[\frac{\partial g_k}{\partial \beta_k}(\hat{\beta})\right]^T = \begin{bmatrix} \frac{\partial g_k}{\partial \beta_{0,k}}(\hat{\beta}) \\ \frac{\partial g_k}{\partial \beta_{1,k}}(\hat{\beta}) \\ \vdots \\ \frac{\partial g_k}{\partial \beta_{N,k}}(\hat{\beta}) \end{bmatrix}, \tag{9}$$

where $$\frac{\partial g_k}{\partial \beta_p}(\hat{\beta}) = \frac{\left\{\sum_i \mu_i(\mu_i - 0.5)^p x_i\right\}\left\{\sum_i \mu_i\left[\sum_{j=0}^N \hat{\beta}_j(\mu_i - 0.5)^j\right]\right\}}{\left\{\sum_i \mu_i\left[\sum_{j=0}^N \hat{\beta}_j(\mu_i - 0.5)^j\right]\right\}^2} \tag{10}$$

$$\frac{\left\{\sum_i \mu_i\left[\sum_{j=0}^N \hat{\beta}_j(\mu_i - 0.5)^j\right] x_i\right\}\left\{\sum_i \mu_i(\mu_i - 0.5)^p\right\}}{\left\{\sum_i \mu_i\left[\sum_{j=0}^N \hat{\beta}_j(\mu_i - 0.5)^j\right]\right\}^2}$$

To simplify the algorithm, again let $\hat{\beta}_k = \hat{\beta}_{k/k}$, so that we can have $$\begin{cases} P_{0/0} = \text{Var}(\beta_0)\hat{\beta} = E(\beta_0) \\ \text{for } k = 1, 2, \ldots, \\ P_{k/k-1} = P_{k-1/k-1} + Q_{k-1} \\ G_k = P_{k/k-1}\left[\frac{\partial g_k}{\partial \beta_k}(\hat{\beta}_{k-1})\right]^T \\ \qquad \left\{\left[\frac{\partial g_k}{\partial \beta_k}(\hat{\beta}_{k-1})\right]P_{k/k-1}\left[\frac{\partial g_k}{\partial \beta_k}(\hat{\beta}_{k-1})\right]^T + R_k\right\}^{-1} \\ P_{k/k} = \left[I - G_k\frac{\partial g_k}{\partial \beta_k}(\hat{\beta}_{k-1})\right] \cdot P_{k/k-1} \\ \hat{\beta}_k = \hat{\beta}_{k-1} + G_k \cdot [d_k - g_k(\hat{\beta}_{k-1})] \end{cases} \tag{11}$$

The Eq. (11) is the final expressions for the M-PTD processor.

Figure 2:
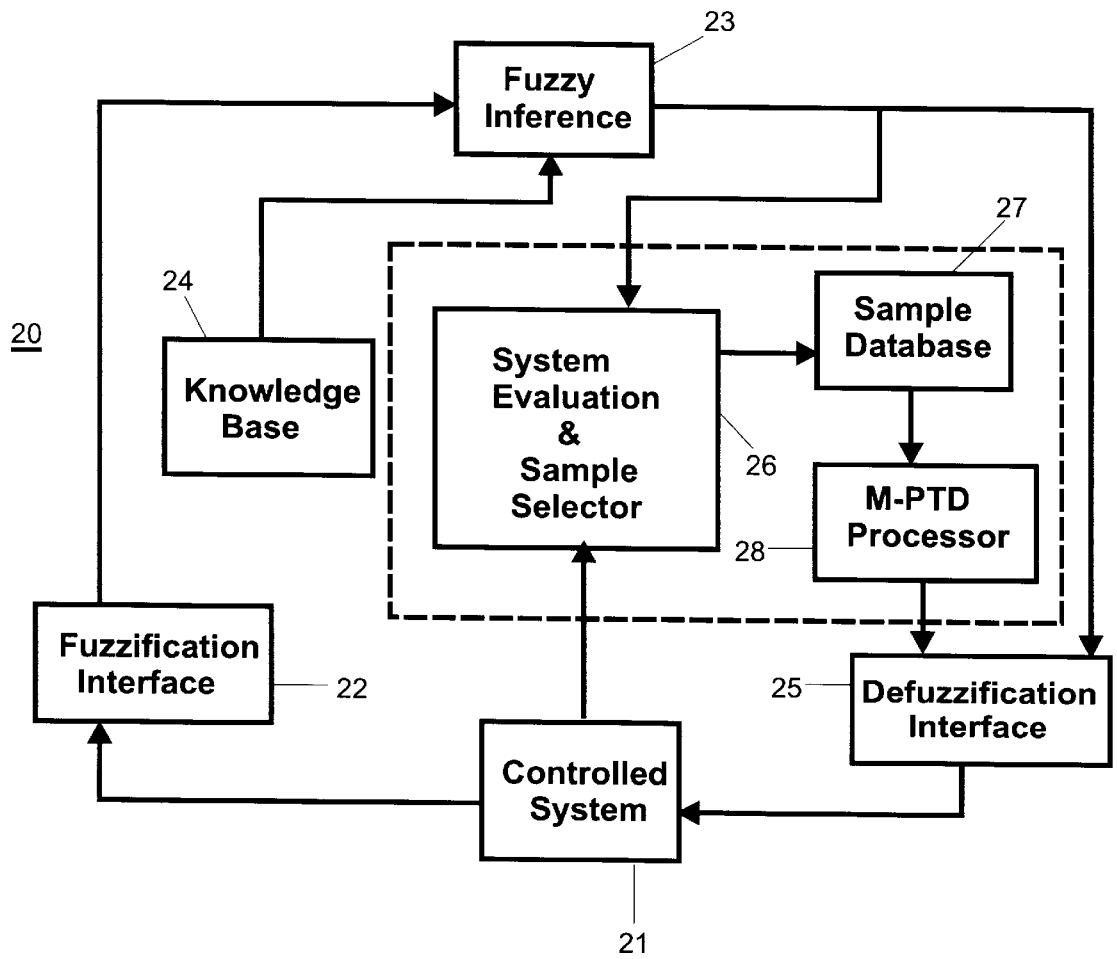
FIG. 2 is a schematic block diagram of a fuzzy logic controller incorporating the multi-mode oriented polynomial transformation based defuzzification strategy that is characteristic of the invention.

The basic configuration of a typical fuzzy logic controller (FLC) 20, for use in controlling a controlled system 21, in accordance with the invention is depicted in FIG. 2.

This fuzzy logic controller 20 comprises seven principal components 22–28 that can be classified into two groups.

The first group corresponds to the traditional configuration of a fuzzy logic controller (FLC) and includes a fuzzification interface 22, a fuzzy inference means 23, a knowledge base 24, and a defuzzification interface 25.

The second group is the core part required for the multi-mode oriented polynomial transformation based defuzzification (M-PTD) strategy that uses a Kalman filter in the parameter learning procedure. The core includes a system evaluation and sample selector 26, a sample database 27, and a M-PTD processor 28.

Returning to the first group, the controlled system 21 is any real world system with the required functionality. It should issue crisp real time data that will be fuzzified into fuzzy sets by the fuzzification interface 22. Then the fuzzy sets, carrying the uncertain information, will be used for the analysis based on fuzzy set theory. The knowledge base 24 is the experience-based data base that will be used by the fuzzy inference means 23. The fuzzification interface 22 will transfer the range of values of input data supplied to it by the controlled system 21 into a corresponding universe of discourse and converts the inputs into suitable fuzzy sets that are then supplied to the fuzzy inference means 23. The latter will process the fuzzy sets and will simulate human decision-making based on fuzzy concepts and fuzzy logic inference rules that are provided to it from the knowledge base 24. The necessary definitions that are programmed in to define the fuzzy logic inference rules and fuzzy data manipulations as well as fuzzy logic inference rules themselves are stored in the knowledge base 24. The defuzzification interface 25 yields non-fuzzy control output. The controlled system 21 receives the final non-fuzzy output from the fuzzy logic controller 20 via the defuzzification interface 25 as the controlled signal for the next action.

The second group is the core part required for the added M-PTD based on a learning process. The system evaluation and sample selector 26 evaluates the system's performance based on feedback from the controlled system 21 and selects samples for the sample database 27 based on the evaluation. The sample database 27 stores the historical learning sample data for the iterative system adaptation, calculated by using a Kalman filter in a parameter learning procedure for the M-PTD defuzzification strategy that was discussed above. The M-PTD Processor 28 receives the output from the sample database 27 and supplies the M-PTD defuzzification strategy discussed to the defuzzification interface 25 for use in converting the range of values supplied to it from the fuzzy inference means 23 into a crisp non-fuzzy output for use by the controlled system 21. The M-PTD processor 28 eliminates the restriction to the sign of the transformation parameter T, as discussed, and makes it possible to extend the generalized DS of the invention to various multi-mode situations.

It is to be understood that the particular schematic shown for the fuzzy logic controller is somewhat arbitrary and that the various operations described for it could be partitioned differently between various functional blocks without departing from the spirit and teaching of the invention which shall be limited solely by the scope of the claims appended hereto.

What is claimed is:

1. A fuzzy logic controller for use with a controlled system, the controlled system providing system data that may be fuzzy and needs to be defuzzified for use in controlling the controlled system, the fuzzy logic controller comprising:

means for receiving the system data for transferring the system data into fuzzy sets;

knowledge base means for storing knowledge-based data;

inference means receiving the fuzzy sets and the knowledge-based data for processing the fuzzy sets and simulating human decision-making based on fuzzy concepts and fuzzy logic inference rules, based on the knowledge-based data to provide fuzzy inferences;

means for receiving the system data for evaluating and selecting therefrom samples for use in learning;

means for receiving the samples for use in learning and developing a sample database;

multi-mode oriented defuzzification means supplied with the samples for use in learning from the sample database and processing the samples based on a learning procedure using an extended Kalman filter to perform information selection, inheritance and abandonment for multi-mode oriented generalized defuzzification to provide defuzzification strategy values; and means supplied with the defuzzification strategy values and the fuzzy inferences and producing therefrom decisive control signals for controlling the controlled system.

2. The fuzzy logic controller of claim 1, wherein the system data is real-time system data.

3. A process for defuzzifying system data provided by a controlled system, the process comprising the steps of:

transforming the system data from the controlled system into fuzzy sets;

processing the fuzzy sets and knowledge-based data and simulating human decision-making based on fuzzy concepts and fuzzy logic inference rules based on the knowledge-based data to provide fuzzy inferences;

evaluating and selecting, from the system data, relevant samples for use in learning;

processing the samples based on a learning procedure using an extended Kalman filter to perform information selection, inheritance and abandonment for multi-mode oriented generalized defuzzification to provide defuzzification strategy values; and utilizing the defuzzification strategy values and fuzzy inferences to provide therefrom decisive control signals for controlling the controlled system.

4. The process of claim 3, wherein the system data is real-time system data.

5. A fuzzy logic controller for use with a controlled system, the controlled system providing system data that may be fuzzy and needs to be defuzzified for use in controlling the controlled system, the fuzzy logic controller comprising:

a fuzzification interface receiving the system data and transforming the system data into fuzzy sets;

a knowledge base having knowledge-based data;

a fuzzy inference unit receiving the fuzzy sets and the knowledge-based data, the fuzzy inference unit processing the fuzzy sets and simulating human decision-making based on fuzzy concepts and fuzzy logic inference rules based on the knowledge-based data to provide fuzzy inferences;

a system evaluation and sample selector receiving the system data and the fuzzy inferences and evaluating and selecting therefrom samples for use in learning;

a sample database receiving and storing the samples for use in learning;

a M-PTD processor receiving the samples for use in learning and processing the samples based on a learning procedure using an extended Kalman filter to perform information selection, inheritance and abandonment for multi-mode oriented generalized defuzzification to provide defuzzification strategy values; and a defuzzification interface receiving the defuzzification strategy values and the fuzzy inferences and producing therefrom decisive control signals for controlling the controlled system.

6. The fuzzy logic controller of claim 5, wherein the system data is real-time system data.

\* \* \* \* \*